May 5, 1959 — H. KRAUSE — 2,884,805
CONTROL MECHANISM
Filed June 22, 1956 — 3 Sheets-Sheet 1

Inventor
Herbert Krause by Parker & Carter
Attorneys

Inventor
Herbert Krause
by Parker & Carter
Attorneys

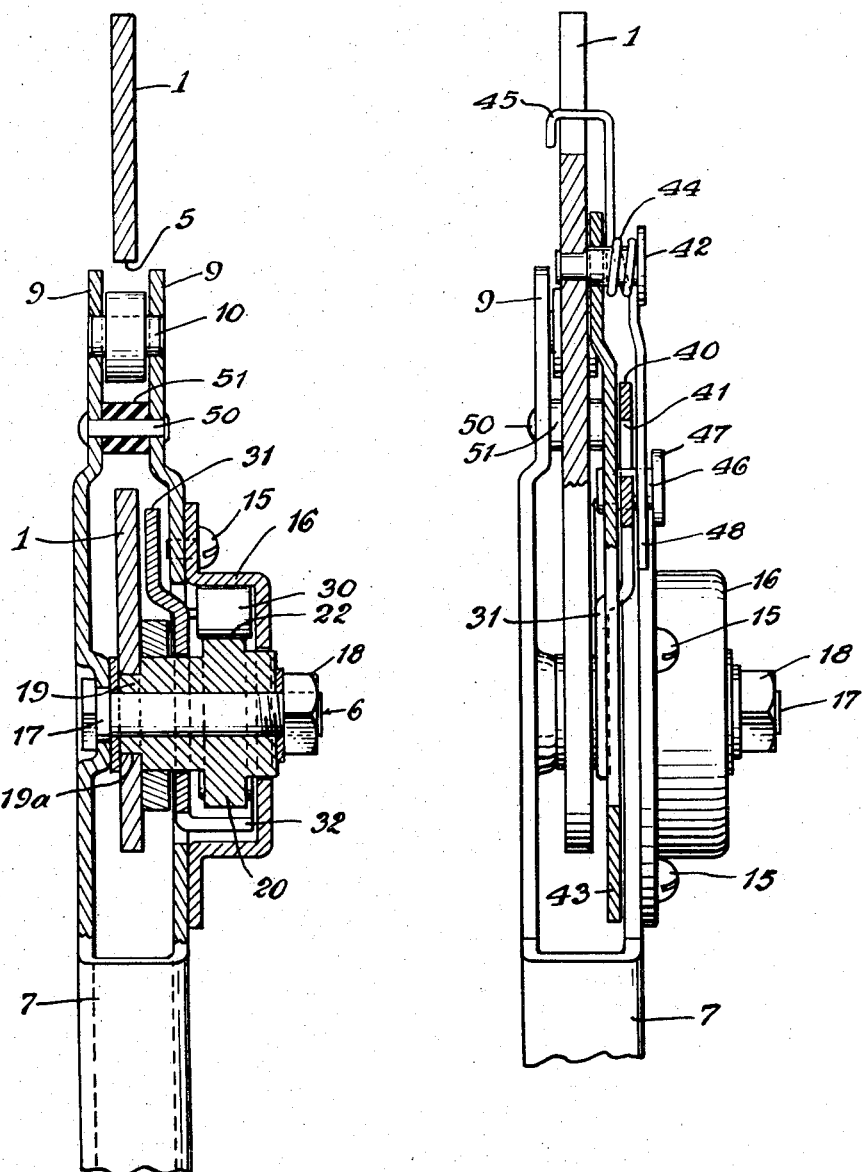

United States Patent Office 2,884,805
Patented May 5, 1959

2,884,805

CONTROL MECHANISM

Herbert Krause, Chicago, Ill., assignor to Chicago Forging and Manufacturing Company, Chicago, Ill., a corporation of Delaware Application June 22, 1956, Serial No. 593,107

3 Claims. (Cl. 74—531)

This invention relates to emergency brakes for vehicles and the like and has for one purpose to provide a control for emergency brakes.

It is one purpose of the invention to provide an emergency brake control which shall be generally silent in operation and which shall be movable with a maximum of smoothness.

Another purpose is to provide a brake control mechanism operable against increasing resistance.

Another purpose is to provide an emergency brake control mechanism having a camming locking means therefor.

Another purpose is to provide an emergency brake control mechanism employing a cam-type locking and releasing device.

Another purpose is to provide an emergency brake control device characterized by ease of operation and incorporating a locking and release mechanism subject to a minimum of play and wear.

Another purpose is to provide a brake control having a particular clutch device effective to lock the control at any position within the established range.

Other purposes will appear from time to time during the course of the specification and claims.

I illustrate my invention more or less diagrammatically in the accompanying drawings wherein—

Figure 4 is a view taken on the line 4—4 of Figure 1, and,

Figure 5 is a view taken on the line 5—5 of Figure 1.

Like parts are indicated by like numerals throughout the specification and drawings.

Figure 1:
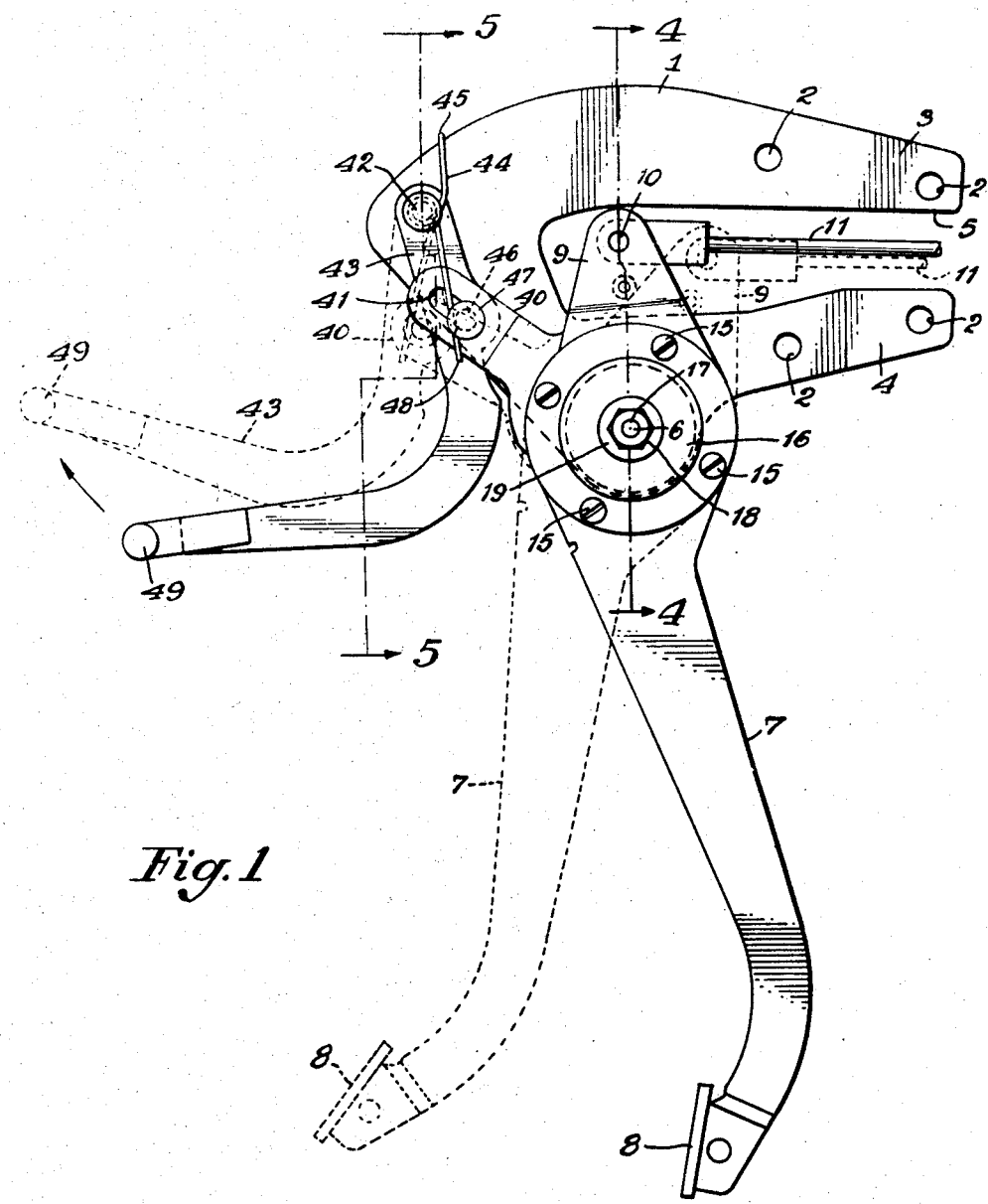
Figure 1 is a side elevation of my invention.

Referring now to the drawings and particularly to Figure 1, the numeral 1 indicates a base or mounting plate. Attachment apertures 2 may be positioned in a pair of spaced arms 3, 4 defining a slot 5 in the plate 1. Rotatably mounted on the plate 1, about the pivot 6 is the control arm or lever 7. The lever 7 has adjacent its lower end, as the parts are shown in the drawings, a foot pedal mounting plate 8 disposed rearwardly, or to the left, as the parts are shown in the drawings. Beyond the pivot 6 from the mounting 8, the lever 7 has a portion 9 overlying the slot 5. The portion 9 has pivotally connected thereto, as at 10, a cable or rod 11. The rod 11 which may itself comprise, or may be connected to, a flexible cable, is in any event in control relationship with the emergency brakes of the vehicle to which the plate is attached. Since emergency brakes and the control cable connection thereto is know, it is not illustrated herein. It will be understood, however, that a spring or other yielding means is provided and is effective, through the cable 11, to urge the brake control lever 7 toward non-operating or brakes-off position as illustrated in dotted lines of Figure 1.

As illustrated in Figures 4 and 5, the brake lever 7 may comprise spaced parallel side walls positioned on opposite sides of the plate 1, in which case the portion 9 may comprise spaced portions positioned on opposite sides of the slot 5. For convenience herein, however, the portion 9 is given a single numerical designation.

Secured to the lever 7, as by attaching means 15, is a housing or cover plate 16 surrounding and generally overlying the area about the pivot point 6. A bolt 17 extends through the plate 1 and pivotally supports the lever 7. The bolt 17 has a nut 18 at its outer end. Secured to the plate 1 by any suitable means is a fixed camming or clutch member 19. The member 19 has its cam portion 20 positioned within the housing 16 and a squared shank fitted into a corresponding opening 19a in the plate 1. The portion 20 has three relatively straight or flattened portions 21, 22, 23 arranged in triangular relationship to each other, the adjacent flattened portions being joined by generally arcuate wall portions 24, 25, 26. The flattened portions 21, 22, 23 lie in intersecting planes and are tangentially disposed with respect to the axis of housing 16 and are circumferentially spaced about and at an equal distance radially from said axis. A set of round or roller members, three in number, are positioned within the housing 16 for movement each along one of the flattened surfaces 21–23. The rollers 30 are held in a cage or raise element 31 rotatably mounted about the pivot 6 and having upstanding roller retaining fingers 32 within the housing 16.

It will be understood that, whereas the cam 20 and followers 30 are shown with the cam fixed to the plate 1, and the rollers movable with the retainer 31, this arrangement could be reversed without departing from the nature and scope of my invention.

The roller positioning or control means 31 comprises also a release element and for this purpose includes a projecting or extending release lever 40 which carries adjacent its outer end an elongated slot 41. Pivoted to the plate 1, as at 42, is a manually operable actuating lever 43 which is in turn yieldingly urged toward non-releasing position by a yielding member which may comprise the spring 44 having one end engaged with the plate 1 as at 45 and its opposite end engaged with a pin 46 fixed on the lever 43 and extending through the slot 41. The pin 46 carries at its outer end the annular flange or cage 47 which aids in retaining the spring end 48 against the pin 46 and across a surface of the lever 40, the action of the spring 44 being effective to hold the pin 46 on the lever 43 against the inward end of the slot 41 and the lever 40, 31 in a lock-applying position. The outer end of the actuating or operating lever 43 may carry a manually operable handle portion 49. As is best seen in dotted lines in Figure 1, upward movement of the handle 49 attached to the generally L-shaped or curved lever 43 is effective to move the pin 46 through the slot 41 and to thereby urge the release lever 40 downwardly or in counterclockwise direction as the parts are shown in the drawing to move the rollers 30 back toward the center of the opposed camming surfaces 21–23.

The slot 5 is bridged by a rivet 50 secured to the lever 7. The rivet 50 carries a stop element 51 formed of flexible material such as rubber. The member 51 silently engages an edge of the slot 5 in the plate 1 when the lever 7 is returned to brakes-off position as illustrated in dotted lines in Figure 1.

Whereas I have described and illustrated a practical and operative device, nevertheless many changes may be made in the size, shape, number and disposition of parts without departing from the spirit of my invention. For example, the rollers 30 may be substituted for by ball members. I find it advantageous, however, to provide a maximum clutching surface by employment of roller members having their circumferential walls in engagement with the camming surface of the member 20 and engageable by the inner circumferential wall surface of the housing or cage 16. Accordingly, the members 30 may be considered generally as rounded members without departing from the nature and scope of my invention. I therefore wish my description to be taken as in a broad sense illustrative or diagrammatic, rather than as limiting me to my precise showing.

The use and operation of my invention are as follows—

The vehicle operator applies the emergency brakes by exerting pressure against the lever 7 to rotate it and the housing 16 in a counterclockwise direction as the parts are shown in the drawings. It will be noted that the member 40, 31 and fingers 32 retain the rounded members 30 comparatively loosely, the distance between the adjacent retaining fingers 32 being greater than the diameter of the members 30. The cam 20 is so fixed on the plate 1 and means 44 is so arranged as to cause the member 40, 31 to hold the members 30 away from the perpendicular radius of the cam surfaces 21–23 and toward one end thereof. Thus counterclockwise rotation of the housing 16, normally held in contact with the members 30, is accomplished with minimum resistance since a simple, smooth rolling action between the members 16, 30 and 21–23 is created, the members 30 being thereby urged toward the mid-point of the camming surfaces and therefore away from latching or binding contact with the housing 16.

Figure 2:
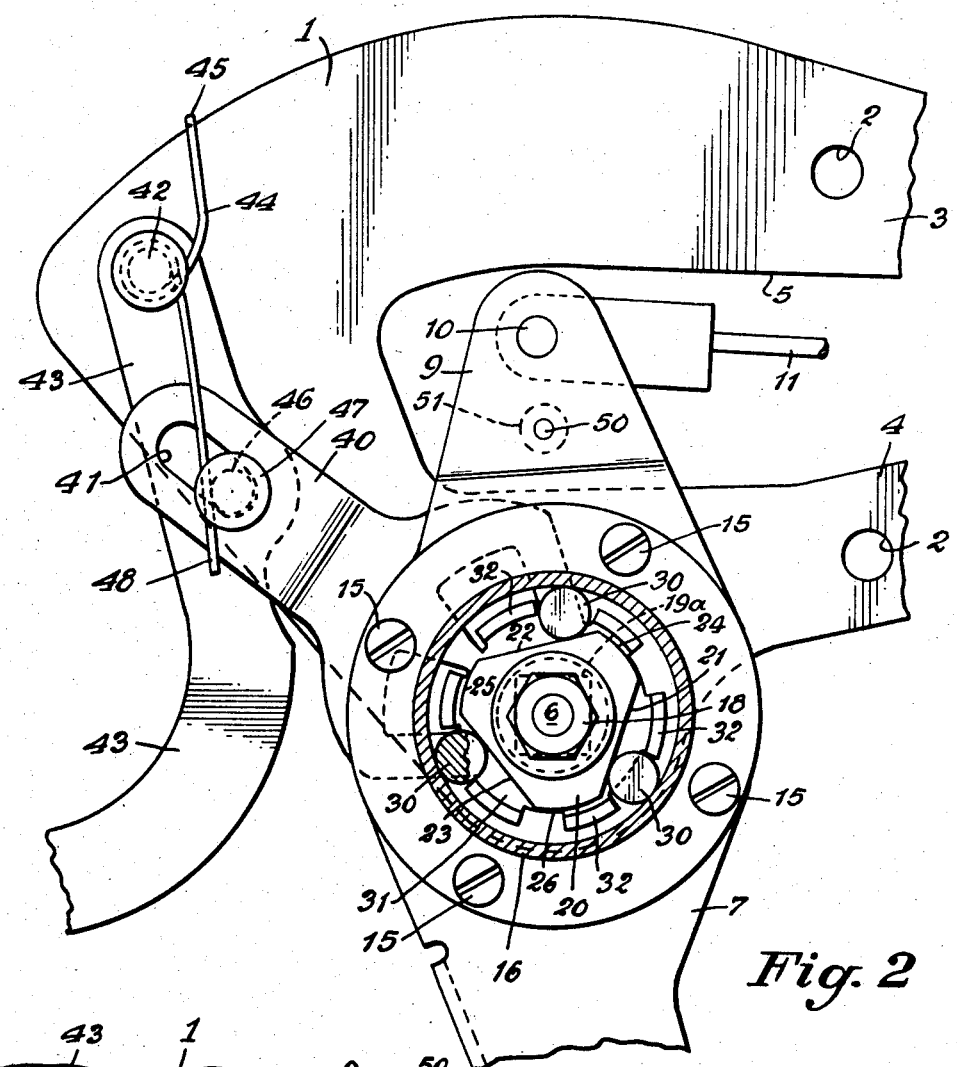
Figure 2 is a detail view, with parts broken away, and on an enlarged scale.
Figure 3:
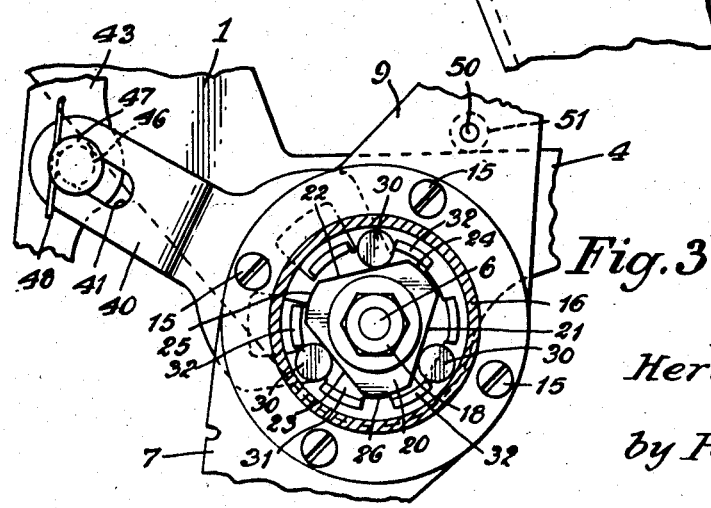
Figure 3 is a view similar to that of Figure 2 on a reduced scale and illustrating the device in another position.

With the parts in the position shown in Figure 2, however, the arm 7 is prevented from rotation in clockwise direction or toward non-locking, non-braking position by the frictional pressure contact of the members 16, 30 and 21–23. Clockwise rotation moves the rollers toward one end of the camming surfaces or toward one corner of the member 20 and therefore into binding contact or compression of the members 30 between the wall of the housing 16 of the camming surfaces.

Movement of the brake control arm 7 toward brakes-on position is noiseless since no serrations or ratchets or other intermittent locking elements are employed. Similarly, resistance to movement of the lever 7 toward brakes-on position is constant and smooth. Various degrees of braking action may, however, be employed by rotation of the lever 7 for various distances toward the full brakes-on position illustrated in full lines in Figure 1, tendency of the lever 7 to return to brakes-off position under the influence of means associated with cable 11 being resisted at all positions by the camming lock action of the elements 16, 30 and 21–23.

The brake control lever 7 may be released from locked, braking position by slight upward movement of the handle 49 on the lever 43. Such movement is effective to rotate the member 40 and fingers 32, as the parts are shown in the drawings, in a counterclockwise direction and thus to move the members 30 rearwardly or toward the center of the opposed camming surfaces and therefore out of binding frictional contact with the housing 16. The yielding means described above, as normally employed in association with the cable 11, is thus permitted to rotate the brake control 7 in a clockwise direction towards brakes-off position as illustrated in dotted lines in Figure 1. To increase forces necessary for release, the roller may be made smaller.

Thus the cage member 31, under the influence of yielding means 44, is effective to urge the roller 30 away from the radial plane which is perpendicular to the corresponding camming surface and to retain the roller member 30 in the plane of what might be called the secant. Manual operating lever 43, however, is effective to move the cage 31 in the required direction to move the rollers toward the perpendicular radial plane of their camming surfaces or toward the camming surface mid-portion to release the frictional compression or contact of the rollers with the housing and camming surface.

By providing a plurality of camming surfaces equally spaced about the axis of the housing 16 and by providing a rounded member 30 for each camming surface, I provide a balanced clutch or locking and release device, thus no counter pressure device or movable element, other than the rollers 30 themselves is required. All that is necessary to release the balanced locking action is a simple rolling movement of the rollers 30 toward the radius point of the camming surface.

I claim:

1. A control mechanism comprising a support, a main lever rotatably mounted on said support, locking means effective to cause locking of said lever at all positions of its travel in one direction and release means effective to cause immediate release of said lever for uninhibited return in the opposite direction, said locking means comprising a cylindrical housing fixed on said lever for rotation therewith, a cam fixed on said support and positioned entirely within said housing, said cam being concentric with said housing and having a plurality of substantially flat cam surfaces lying in intersecting planes and opposed to circumferentially spaced arcuate portion of the cylindrical wall of said housing, a rounded member positioned between each of said cam surfaces and the opposed portion of said cylindrical wall, said rounded members having a diameter less than the space between said cylindrical wall and the central portion of said cam surfaces and greater than the space between said cylindrical wall and the opposite end portions of said cam surfaces, said release means comprising a release member rotatably mounted on said support concentrically with said cam and housing and having finger portions extending into said housing and movable into engagement with said rounded member to move the same toward the center of said cam surface in response to rotation of said release member.

2. A control mechanism for emergency brakes and the like comprising, in combination, a support, a cam member fixed on said support and having a plurality of cam surfaces tangentially disposed in relation to the axis of said cam member, said cam surfaces being circumferentially spaced about and equidistant radially from the axis of said cam member, a brake lever pivoted on said support for rotation about and concentrically with the axis of said cam member, a housing fixed on said brake lever for rotation concentrically therewith, said housing enclosing said cam member and having a cylindrical wall surrounding said cam member, yielding means secured to said brake lever to urge said brake lever toward brakes-off position, a roller enclosed between each of said cam surfaces and an opposed portion of said cylindrical housing wall, a release lever pivotally mounted on said support for rotation about and concentrically with the axis of said cam member, said release lever having an arm portion extending radially from the axis of said cam member and beyond said cylindrical housing wall, said release lever having finger elements extending into said housing and rotatable into engagement with said rollers and means for rotating said release lever including an operating lever movably mounted on said support and having an operating engagement with said release lever arm portion.

3. In combination, a support, a main brake lever mounted on said support for rotation about a fixed axis, a cam member fixed on said support co-axially with said brake lever, a housing fixed on said brake lever for rotation concentrically with the axis of and surrounding said cam member, rollers within and movable toward frictional engagement with said housing in response to rotation of said lever in one direction, and release means comprising a lever pivotally mounted on said support for rotation about said axes of said cam member, brake lever and housing, said release lever having a radially extending arm portion, said release lever having finger elements spaced circumferentially about its axis of rotation and extending into said housing for engagement with said rollers and an actuating lever movably mounted on said support and having an actuating engagement with said release lever arm portion.

References Cited in the file of this patent

UNITED STATES PATENTS

| | | |
|---|---|---|
| 830,146 | Hamilton et al. | Sept. 4, 1906 |
| 1,680,618 | Hutton | Aug. 14, 1928 |
| 2,021,336 | Swartz | Nov. 19, 1935 |
| 2,066,167 | Swartz | Dec. 29, 1936 |
| 2,139,863 | Snell | Dec. 13, 1938 |
| 2,429,900 | Spraragen | Oct. 28, 1947 |
| 2,458,446 | Suska | Jan. 4, 1949 |
| 2,516,433 | Suska | Jan. 25, 1950 |
| 2,722,136 | Krause | Nov. 1, 1955 |

FOREIGN PATENTS

| | | |
|---|---|---|
| 41,785 | France | Jan. 16, 1933 |
| 797,525 | France | Feb. 17, 1936 |